United States Patent
Ristock et al.

(10) Patent No.: US 8,934,612 B2
(45) Date of Patent: Jan. 13, 2015

(54) CUSTOMER-CENTRIC NETWORK-BASED CONFERENCING

(75) Inventors: Herbert Willi Artur Ristock, Walnut Creek, CA (US); Vyacheslav Zhakov, Burlingame, CA (US); Yevgeniy Petrovykh, Walnut Creek, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 14 days.

(21) Appl. No.: 13/489,886

(22) Filed: Jun. 6, 2012

(65) Prior Publication Data
US 2013/0329865 A1    Dec. 12, 2013

(51) Int. Cl.
*H04M 1/64* (2006.01)

(52) U.S. Cl.
USPC ............. 379/88.01; 348/14.08; 370/260; 370/261; 379/202.01; 379/204.01; 455/416; 709/204; 709/225

(58) Field of Classification Search
CPC .......... H04M 3/56; H04M 2203/2072; G06Q 10/109; H04L 12/1818
USPC .......... 370/260, 261; 379/93.21, 202.01, 379/88.01, 204.01; 709/206, 204, 205; 348/14.08; 455/416
See application file for complete search history.

(56) References Cited

U.S. PATENT DOCUMENTS

| | | | |
|---|---|---|---|
| 6,363,352 B1 * | 3/2002 | Dailey et al. | 705/7.19 |
| 7,151,753 B2 * | 12/2006 | Chaney et al. | 370/261 |
| 7,436,428 B2 * | 10/2008 | Schrader et al. | 348/14.08 |
| 7,822,185 B2 * | 10/2010 | Nguyen et al. | 379/202.01 |
| 8,175,241 B2 * | 5/2012 | Nguyen | 379/202.01 |
| 8,326,927 B2 * | 12/2012 | Asthana et al. | 709/204 |
| 8,359,356 B2 * | 1/2013 | Belz et al. | 709/206 |
| 8,369,247 B2 * | 2/2013 | I'Anson | 370/260 |
| 8,437,461 B1 * | 5/2013 | Gartner et al. | 379/202.01 |
| 8,582,743 B2 * | 11/2013 | Teng et al. | 379/204.01 |
| 2002/0009990 A1 * | 1/2002 | Kleier et al. | 455/416 |
| 2004/0047461 A1 * | 3/2004 | Weisman et al. | 379/202.01 |
| 2004/0128353 A1 * | 7/2004 | Goodman et al. | 709/204 |
| 2005/0078612 A1 * | 4/2005 | Lang | 370/260 |
| 2006/0101143 A1 * | 5/2006 | Garcia et al. | 709/225 |
| 2007/0133438 A1 * | 6/2007 | Shaffer et al. | 370/260 |
| 2008/0065758 A1 * | 3/2008 | Narayanaswami | 709/224 |
| 2008/0084832 A1 * | 4/2008 | Haruna et al. | 370/260 |
| 2009/0055475 A1 | 2/2009 | Sekaran et al. | |
| 2010/0161579 A1 | 6/2010 | Fan et al. | |
| 2010/0165888 A1 * | 7/2010 | Turner | 370/260 |
| 2010/0246448 A1 * | 9/2010 | Krantz et al. | 370/260 |

(Continued)

OTHER PUBLICATIONS

International Search Report and Written Opinion for International Application No. PCT/US13/44176, with a mailing date of Oct. 16, 2013, 6 pages.

*Primary Examiner* — Gerald Gauthier
(74) *Attorney, Agent, or Firm* — Christie, Parker & Hale, LLP

(57) ABSTRACT

A communication system has a network-connected server comprising a processor and a coupled data repository and software executing on the processor from a non-transitory medium. The software provides a first function establishing a communication session between an initiator and an agent of an enterprise hosting the system, a second function gathering information about persons other than the initiator and the agent as potential conference participants, a third function generating and sending invitations to a conference to include the initiator and the agent to individual ones of the potential conference participants, and a fourth function connecting those accepting invitations to the conference.

19 Claims, 5 Drawing Sheets

(56) References Cited

U.S. PATENT DOCUMENTS

| | | | |
|---|---|---|---|
| 2011/0093548 A1* | 4/2011 | Das et al. .................. 709/206 |
| 2011/0208819 A1* | 8/2011 | Roskowski et al. .......... 709/206 |
| 2012/0072506 A1* | 3/2012 | Horstmann et al. .......... 709/206 |
| 2012/0128146 A1* | 5/2012 | Boss et al. ............... 379/202.01 |
| 2012/0290668 A1* | 11/2012 | Jeong et al. .................. 709/206 |
| 2012/0321060 A1* | 12/2012 | Lucey et al. ................ 379/93.21 |
| 2013/0024531 A1* | 1/2013 | Horstmann et al. .......... 709/206 |
| 2013/0179518 A1* | 7/2013 | Quan .......................... 709/206 |
| 2013/0204949 A1* | 8/2013 | Elleouet et al. .............. 709/206 |
| 2013/0329865 A1* | 12/2013 | Ristock et al. ............. 379/88.01 |

* cited by examiner

CUSTOMER-CENTRIC NETWORK-BASED CONFERENCING

BACKGROUND OF THE INVENTION

1. Field of the Invention

The present invention is in the field of telephony including data network telephony and pertains particularly to methods and apparatus enabling a consumer-controlled conferencing feature for contact centers or other third-party service providers.

2. Discussion of the State of the Art

The field of telephony communications has expanded with the advent of the Internet network and accompanying protocols such as voice over Internet protocol (VoIP) and others that enable video and voice communications over data networks such as the Internet and connected sub-networks. One area where telephony advances are commonly tested and deployed are contact centers that provide information and transaction services for corporate and small business clients. Many state-of-art contact centers employ automated attendants like an interactive voice response (IVR) unit to provide selectable options to incoming callers and then connect those callers to the selected services, which may include routing to live agents or further automated options or processes. A universal goal of contact center and other customer contact applications is to develop more loyal customers for the represented business or corporate client.

State-of-art contact centers also employ outbound contact servers and software to reach potential customers at home. Outbound contact services are also employed to contact potential customers that are visiting enterprise Web pages like product description pages or the like. Outbound contact services may be designed for Web-based advertisements and linked to such ads so that any interaction with an ad triggers an invitation to speak to a live agent or to receive a call back at some later time. Among other contact center tools are multi-party conferencing applications that connect multiple parties to a same communications session wherein all parties can interact with one another and wherein all of the interaction may be recorded for later use.

Several challenges exist for enterprise contact systems including contact centers relative to reaching a larger number of potential consumers. Outbound contact campaigns are largely predictive in nature meaning that a percentage of contacts dialed are not available at the time of dial. Moreover, a percentage of those potential customers reached through outbound contact are placed in queue because all agents are busy helping others. This may result in drop out from queue and call abandonment in some cases. In general, outbound campaigns require much planning and orchestration, and utilize significant contact center resources.

With respect to conferencing tools, current applications are agent-centric meaning that the utility is used mainly for multi-party meetings for planning, or to aid in resolving customer issues such as technical issues or problems with products or services. Customers have no control over conference call set-up or implementation and therefore have no control in which parties are connected or what outcomes may occur. It has occurred to the inventors that if, at the point of contact, a customer could be caused to initiate a telecommunications conference that could include other potential customers on the fly or scheduled to attend, significant improvement in efficient and cost-effective customer contact might result.

Therefore, what is clearly needed is a telecommunications conferencing feature for contact centers or other third-party providers that allows users in communication with the center or provider to initiate a conference session, and to control, at least to some extent, which other persons will be invited to participate in the conference session, and how the invitation process is orchestrated.

SUMMARY OF THE INVENTION

The problem stated above is that efficient dissemination of relevant product and service information to consumers is desirable for a contact center, but many of the conventional means for disseminating product and service information, such as through targeted outbound contact and advertising campaigns can be expensive to run and difficult to plan relative to predicted availability states, resource availability, and target relativity of the potential customers targeted during such campaigns. The inventors therefore considered functional components of a telecommunications system, looking for elements that exhibit the potential for seamless interoperability that could potentially be harnessed to provide efficient dissemination of information to potential customers, but in a manner that would not create more expense or difficulty in planning.

Every contact center is characterized by one or more continually offered transaction processes, one by-product of which is a recordable expansion of customer base over time. Most such contact centers employ telecommunications equipment and software to inform potential customers about products and services offered, and teleconference applications supporting communication between two or more parties in a session are typically a part of such apparatus.

The present inventor realized in an inventive moment that if, at the point of contact, a customer could be caused to initiate a telecommunications conference that could include other potential customers or other parties on the fly or scheduled to attend, significant improvement in efficient and cost-effective communication would be a likely result. The inventor therefore provides a unique telecommunications conferencing feature for contact centers or other third-party providers that allows users in communication with the center or provider to initiate a conference session and control, at least to some extent, who else will be invited to attend the session and how the invitation process is orchestrated. A significant increase in targets for receipt of product and service information results, with no impediment to planning or cost efficiency.

Accordingly, in an embodiment of the present invention, a communication system is provided comprising a network-connected server comprising a processor and a coupled data repository and software executing on the processor from a non-transitory medium. The software provides a first function establishing a communication session between an initiator and an agent of an enterprise hosting the system, a second function gathering information about persons other than the initiator and the agent as potential conference participants, a third function generating and sending invitations to a conference to include the initiator and the agent to individual ones of the potential conference participants, and a fourth function connecting those accepting invitations to the conference.

In one embodiment the initiator is connected in the system to an interactive voice response server that elicits intent of the initiator to use available conferencing functions of the system, and initiates said functions as requested. Also in one embodiment the generating includes establishing a list of invitees to be followed in sending the invitations. Also in one embodiment the initiator uses a computerized communication appliance executing an application compatible with the software at the communication system, and the establishing of the list of invitees is accomplished at the initiator's computerized appliance, and provided to the communication system for use in sending the invitations. In some embodiments the list of invitees is produced entirely by functions at the communication system.

In one embodiment the gathering information about persons other than the initiator and the agent as potential conference participants includes gathering information from one or more of a contact list of friends, a public contact directory, and a customer contact list. The communication system may maintain a variety of communication channels, including two or more of telephone, videophone, video and voice over Internet protocol (VoIP), short message services (SMS), multimedia message services (MMS), chat, and instant message (IM), and wherein conference functions may be accomplished over one or more of the available channels. In one aspect the host of the system is a sales enterprise, and rewards are offered for initiators to provide conference participants. In some cases an initiator has a pre-stored profile of one or more participants to be conferenced with the initiator and an agent for every call to the system.

In another aspect of the invention a method for establishing a conference is provided, comprising the steps of (a) using a network-connected server comprising a processor and a coupled data repository and software executing on the processor from a non-transitory medium, establishing a communication session between an initiator and an agent of an enterprise hosting a communication system; (b) gathering information by the system about persons other than the initiator and the agent as potential conference participants; (c) generating and sending invitations to a conference to include the initiator and the agent to individual ones of the potential conference participants; and (d) connecting those accepting invitations to the conference.

In one embodiment of the method there is a step for connecting the initiator in the system to an interactive voice response server that elicits intent of the initiator to use available conferencing functions of the system, and initiates said functions as requested. Also in one embodiment the generating includes establishing a list of invitees to be followed in sending the invitations. In some embodiments the initiator uses a computerized communication appliance executing an application compatible with the software at the communication system, and the establishing of the list of invitees is accomplished at the initiator's computerized appliance, and provided to the communication system for use in sending the invitations.

In some cases the list of invitees is produced entirely by functions at the communication system, while in other cases the list is generated entirely by the system. In some embodiments the gathering of information about persons other than the initiator and the agent as potential conference participants includes gathering information from one or more of a contact list of friends, a public contact directory, and a customer contact list.

In many embodiments the communication system maintains a variety of communication channels, including two or more of telephone, videophone, video and voice over Internet protocol (VoIP), short message services (SMS), multimedia message services (MMS), chat, and instant message (IM), and wherein conference functions may be accomplished over one or more of the available channels.

In one case the host of the system is a sales enterprise, and rewards are offered for initiators to provide conference participants. In some cases initiator has a pre-stored profile of one or more participants to be conferenced with the initiator and an agent for every call to the system.

BRIEF DESCRIPTION OF THE DRAWING FIGURES

DETAILED DESCRIPTION

The present inventors provide a unique telecommunications conferencing feature for contact centers or other third-party providers that allows users in communication with the center or provider to initiate a conference session and control, at least to some extent, who else will be invited to attend the session and how the invitation process is orchestrated. The present invention will be described in enabling detail using the following examples, which may describe more than one relevant embodiment falling within the scope of the present invention.

Figure 1:
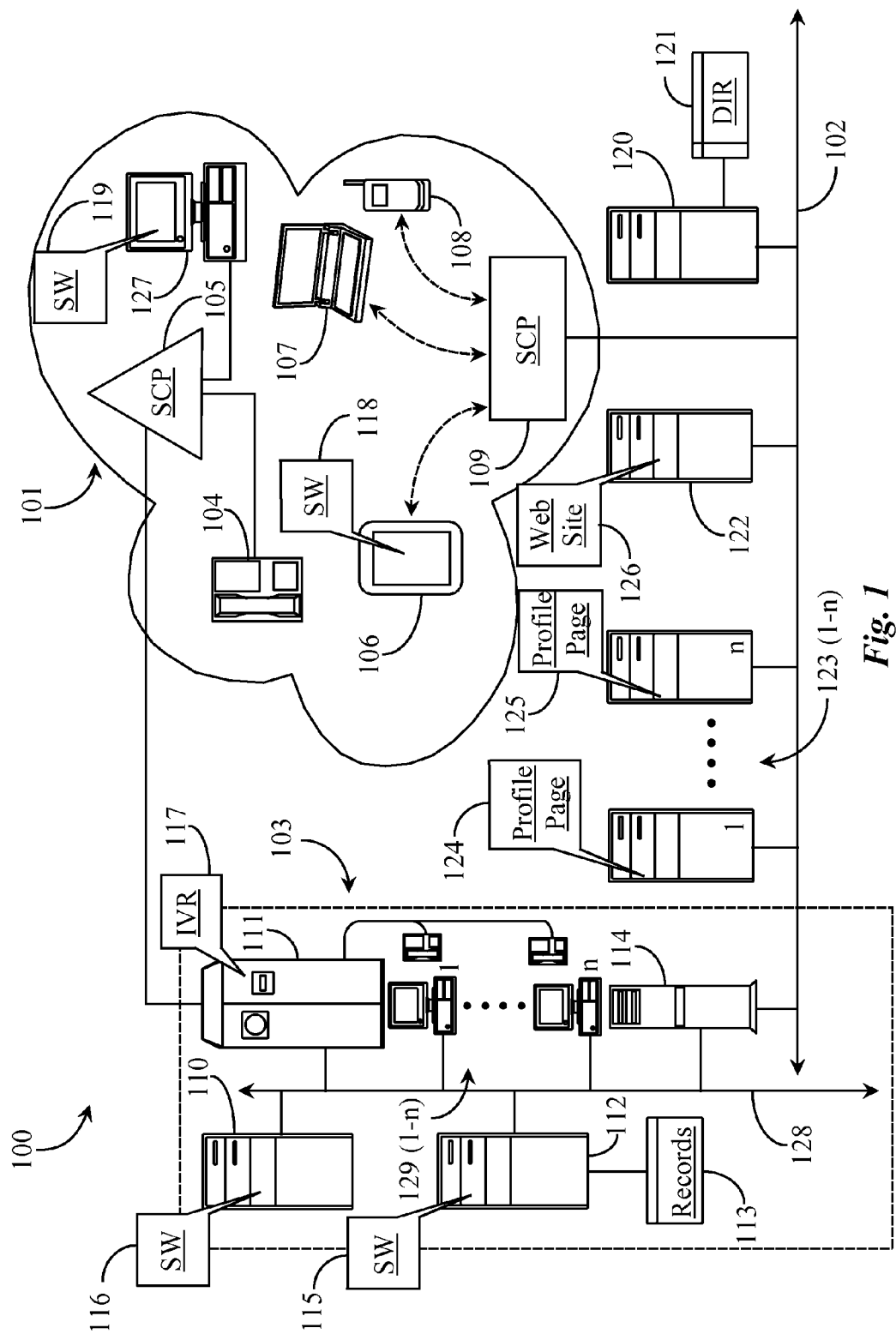
FIG. 1 is an architectural overview of a communications network supporting customer-centric teleconferencing according to an embodiment of the present invention.

FIG. 1 is an architectural overview of a communications network 100 supporting customer-centric teleconferencing according to an embodiment of the present invention. Communications network 100 includes an Internet network 102. Internet backbone 102 represents all of the lines, equipment, and access points that make up the Internet as a whole, including connected sub-networks. Therefore there are no geographic limitations to the practice of the present invention. Communications network 100 includes at least one Internet-connected sub-network 101. Sub-network 101 is a communications carrier network. Sub-network 101 is a wireless carrier network in this example. Network 101 may be a wireless fidelity network (WiFi), a wireless local area network (WLAN), a municipal area network (MAN), a digital cellular network, or any other network segment that supports telecommunications including the well-known public switched telephone network (PSTN).

In this example, network 101 is a wireless carrier network, however in other examples, a wired or hybrid communications network may be utilized. Network 101 includes a service control point 105. Service control point 105 may represent a telephony switch in this example wherein the network may be a PSTN segment. The type of telephone switch may be an automated call distributor (ACD) switch or a private branch exchange (PBX) switch, or any other hardware or software telephony switch capable of forwarding communications requests to another switch or processing point. In this case, SCP 105 is connected by telephony cable to a telephone switch 111 located within a call center 103. A telephone 104 represents a user accessing call center 103 through a telephone line to switch 105 and over telephony cable to switch 111. A desktop computer 127 enabled for telephony communications represents a user accessing call center 103 through a telephone line to switch 105 and over the telephony cable to switch 111. Computer 127 and telephone 104 represent two telephony-enabled devices that may be used in the practice of the present invention.

Network 101, in an embodiment of a wireless carrier network, includes a iPad type computing appliance, a Laptop computing appliance, and a cellular telephone 108, all representing users accessing call center 103 by way of a wireless Internet service provider gateway 109, connected to Internet backbone 102 by an Internet access line, an Internet protocol (IP) router 114 connected to backbone 102, and to a local area network (LAN) 128 within call center 103. Router 114 may be an intelligent router hosting a voice response unit and multimedia routing capabilities. In a preferred embodiment, appliances 106, 107, and 108 are enabled for voice and video over Internet protocol. However, that is not specifically required in order to practice the invention as conferencing in this embodiment supports any type of communications channel including voice, video, text messaging, and Web chat. Other appliances and methods of connection to call center 103 may be utilized in this embodiment without departing from the spirit and scope of the present invention.

Call center 103 represents an enterprise engaged in marketing and or servicing customers of one or more client businesses. In one aspect of the invention, call center 103 is an in-house facility to a business or corporation and solely serves the enterprise in performing the functions of sales and service relative to the products and services available through the enterprise. In another aspect, call center 103 is a third-party service provider. Switch 111 represents a telephony switch that is supported, in this example, by LAN 128. LAN 128 supports agent workstations or terminals 129 (1-n). Terminals 129 (1-n) are customer service terminals operated by customer service representatives or agents of the enterprise or contact center. Each terminal includes a LAN-connected computer appliance with display and a telephone. The telephones in this example are connected to switch 111 by internal telephone wiring. Telephones at terminals 129 (1-n) may also be Internet protocol (IP) phones connected to respective LAN computers or connected directly to LAN 128. There are many possible connection variations.

In this example, call center 103 has an interactive voice response (IVR) unit 117 connected on LAN 128. IVR 117 functions to interface with callers to determine, for example, caller intent to aid in routing calls to available agents. IVR 117 may include one or more automated transaction services, call transfer options, and other sales and service related options. Terminals 129 (1-n) may participate as end devices for a plurality of multimedia channels including VoIP, text messaging, email, data call, Web interactions, and video and voice conferencing.

LAN 128 supports a multichannel conference server 112. Conference server 112 includes a processor, a coupled data repository, and a non-transitory physical medium storing data and software required to function as a conference server. Conference server 112 may host all forms of multimedia and telephony interactions using a multichannel conference software application 115. Software 115 may include a conference bridge, an auto attendant for connecting participants, and multiple channels of varied media. SW 115 is adapted to support any form of real-time interaction media including video, voice, and text channels facilitating connection for those participants that prefer or have used those channels to join a conference in session. SW 115 is enabled as well in this embodiment to record all conference interactions and associate the interaction records by conference session identification, by participant, and/or other methods. Conference server 112 includes a connected data repository 113 adapted to store and retrieve all recorded transcripts and multimedia versions of conference sessions. In configuration of the recording functions of the conferencing system, there are configuration options for seeking permission of participants to record, and in some cases, announcement of recording is made at the beginning of a conference, allowing participants to opt out if they so desire. Recorded conferences may be saved and used by the contact center for training and other purposes, and in some cases may be made available to customers and participants for various purposes. In one embodiment, at configuration of an initiator of the conference, a recording may be made and a transcript provided to the initiator at the conclusion of the conference.

LAN 128 in this embodiment also supports an outbound contact server 110. Outbound contact server 110 includes a processor, a coupled data repository, and a non-transitory physical medium storing all of the data and software required to function as a contact server. Outbound contact server 110 is adapted to place calls and other transactions to individuals and groups, and to invite same to join some form of interaction with the center. For example, server 110 may be equipped with a telephony dialing application (not illustrated) that may be used to call persons listed in an outbound campaign and then connect them to waiting sales agents. Outbound server 110 may be a full multimedia outbound server that may perform outbound contact duties using text message notifications, telephony calls, screen pops, Web notifications, email, and the like depending upon the nature of the campaign. Typically, an outbound campaign, such as a calling campaign includes logic that tells the system if someone answered an invitation, such as call detection SW that listens for the invited party called. In this example, server 110 represents any node that is capable of outbound notification using any form of real time media.

In this embodiment outbound server 110 hosts conference invitation software 116. SW 116 is adapted to generate and send out invitations to potential conference invitees. In one embodiment, SW 116 receives input in the form of a list of contacts for processing according to contact information and preferred conference channel. A potential conference invitee may prefer to join the conference using a text-based channel such as an IM channel. An invitation sent to such an individual might arrive over an IM channel and that user may accept the invitation and join the conference in progress using IM. In some cases invitations may be made on one channel and the person invited may join on a different channel. In one embodiment, the list of contacts includes instant and projected presence information. Presence information may be a predictor of whether an invitee will be available at the time a requested conference is scheduled. SW 116 may parse presence data about invitees and use that information to cull the contact list to those who are expected to be available.

It will be apparent to the skilled person that SW applications 115 and 116 may be combined and executed from a non-transitory medium of a processor of a single server node without departing from the spirit and scope of the present invention. The process of aggregating a contact list and sending out invitations to an instant or scheduled conference session may be isolated to a dedicated machine such as outbound contact server 110. The conference bridge may be hosted on any suitable multichannel communications interface, in this case, conference server 112.

To practice the present invention in one embodiment, a user may initiate contact with call center 103 such as by telephone 104. In this case, IVR 117 intercepts the request at switch 111 and processes the request along with other routine call requests. During IVR interaction, or after routing and during interaction with an agent, an option may be presented to the caller to initiate a conference that includes friends, associates, business partners, one or more advisers, or other potential invitees that might have something in common with the caller making the request. In one aspect, the customer may control the contact invitation process where the contact for invitation may be pulled from recorded data regarding the caller. In another aspect, the call center may exert control over some or all of the contact invitation process by aggregating contacts that are known to the call center and that share something in common with the customer. A feature option may include a discount to the caller if a minimum number of potential invitees can be successfully added to a conference session elected by the customer. If the user requests a conference during interaction with an agent, then that agent may be included in the conference session. If the customer requests the conference from an automated menu in IVR 117, then an agent may be later added as a result of invitations sent to one or more agents.

If the customer selects a multichannel conference option, the system may request a minimum or arbitrary number of contacts for invitation purposes. In one embodiment where the customer is using a telephone during the request, the system has predetermined access to one or more of the customer's contact lists and can aggregate the contact information required to generate invitations to those selected from one or more contact lists. If the customer accesses contact center 103 over the Internet using a computing appliance such as desktop computer 127, the option may include a process where that customer uploads one or more contact lists stored on computer 127. Telephone 104 may include a list of telephone contacts that with the aid of an upload feature might be submitted during IVR or agent interaction with the customer. These records may be forwarded to outbound server 110 for processing with the aid of SW 115.

A client software application 118 is illustrated running on smart phone 106. SW 118 may communicate with SW application 116 running in call center 103 on server 110. SW 118 may enable quick aggregation of local contacts known to the customer like Facebook friends, for example, or a tax specialist, or an attorney, for example. Such a list may be automatically, or manually created as a result of selecting the conferencing option, and receiving notification of and session ID of the pending conference session. The list may then be forwarded to outbound contact server 110 running SW 116. Server 110 aided by SW 116 may process the received contacts for contact data, demographics, presence information, etc. SW 116 may include logic that may aid the system in determination of the final number of contacts for which invitations are generated based on evaluation of the available data. In one embodiment the contact center may have an option of vetting the list of invitees provided by a customer, and may drop one or more in the list for any one of various reasons. Also in some cases, there may be anonymous attendees in a conference. This option or circumstance may be made by the initiator or by the contact center with notification to participants.

In one embodiment a customer contact list may include, for example, 20 persons having contact data, identification, and presence data reported at the time of list submission. It may be determined by the system during list processing that only 10 individuals are required to join to fulfill the goal of the conference (10 persons=50% discount). Presence data might indicate that 14 of the 20 individuals are likely to be available at the time of invitation. Therefore, SW 116 may send invitations to conference to all 14 of those potential invitees for whom presence indication was positive. The six potential invitees who would not likely be available during the conference might be skipped over or culled from the list. Presence information about potential invitees may be provided such that the expected or future presence or availability of the individual for specific communications channels is reported. In this case, the system may determine, by looking at the expected presence data for all of the potential invitees, the optimum time to schedule the requested conference session.

A client software (SW) application 119 is illustrated running on desktop computer 127 and is analogous to client application 118, except that it is tailored more for the embodiment of a desktop computing host rather than a smart phone host. The system may be enabled to cancel or disqualify a requested conference if not enough potential invitees are expected to be available during the session. If there is a minimum number of participants that must be met to enable an active conference, and that minimum number cannot be raised through the available contacts submitted to outbound server 110 for processing, the server may send a notification to the agent in communication with the requesting customer or a dynamic menu response to the IVR that informs the customer of the situation.

In one embodiment, SW instances 118, 119 may be adapted to perform outbound contact through messaging, Web notification, or other methods. In such an embodiment, the invitations containing the conference details and authentication data, if any is required, may be propagated directly from mobile or tethered computing appliances to potential conference invitees. In such a case, the individuals that received the invitations and are available during the proposed conference session time can connect to the conference when the conference is open for connection. This case might be useful when only a few other individuals may join the conference along with the agent and the initial requestor of the conference. An example might be that of a customer electing to conference with a car salesman by bringing in one or more friends or family members that might ask better questions to help the potential buyer make a decision. Such a feature might be offered by the car lot as a customer centric or driven perk to give them more confidence in the decision making process.

Internet backbone 102 supports Web servers 123 (1-$n$). Web servers 123 (1-$n$) represent social interaction site hosts for a variety of know social interaction sites to which a customer might subscribe. Profile pages 124 and 125, which represent any accessible profile page or social interaction page associated with an individual or group of individuals further depict this feature. A customer operating smart phone 106 might request a conference during interaction with call center 103 (via IVR, live agent, or agent interface).

In one embodiment, the customer may direct the system to "add my friends from Facebook to a conference with the agent". This request may be submitted to IVR or to a live agent or to an agent interface such as a voice message machine, chat window, Web interface, or some other communications channel. In this case, the contact center may already know who the customer's Facebook friends are by the fact that the customer has, in the past, submitted the Facebook list or had given permission for the system to access the current list from the customer's profile page. In this case, all of, a predetermined number of, or a calculated number of the customer's Facebook friends may be sent interactive invitations by posting the invitations to the public part of their own Facebook account page so that they receive the invitation to conference.

A Facebook invitation to conference may include the identification of the initiator, the data and time of the conference, the subject of the conference, any authentication data required to join the conference, and any motivating messages that seek to solicit the potential conference participant. For example, the system may prompt an invitee to join the conference in session in return for a 10 percent discount on any future items bought within the next week. In one embodiment, the system may invite-to-conference all or a specific maximum number of members of a social group having presence on a social interaction page. An auto parts store agent may, while interacting with a member of an automotive club with a presence on Facebook, invite all of the other members of the club by posting interactive links to the conference on the respective Facebook profile pages of those club members. The first 15 members of the club to accept and connect may also receive a specified discount on certain products or services offered by the auto parts store. There are many possibilities.

Outbound server 110 may generate and post interactive conference links on the public profile pages of individuals whose contact information was aggregated by SW 116 or submitted to the SW by the conference requestor. The interactive links may include hypertext, graphics, and video. An invitee simply initiates the invitation link to connect to and join the conference. Internet backbone 102 supports a Web server. Web server 122 includes a non-transitory physical medium that contains all of the data and software required to enable function as a Web server. Website 126 in one embodiment represents a site maintained by the service provider (call center), or a company providing customer-centric conferencing services.

In one embodiment users may register for customer-centric conference services and may predetermine who will be invited when the customer requests a conference during interaction with the business. Protected contact lists may be forwarded to the business in one case, or they may be aggregated on the fly. In one embodiment, a customer may predetermine that a specific individual or individuals be invited anytime a conference request is granted to that customer. This scenario may be especially helpful for customers that require help, translation, or aid in negotiating transactions. In one embodiment, the system may be used in certain professional settings where it is important to always have legal representation or other such aid present during negotiations or during specific types of transactions such as real estate, intellectual property, law suits, and so on.

In many cases, contact information regarding individuals is publicly known and accessible by querying a directory server. Backbone 102 supports a directory server 120. Server 120 includes a non-transitory physical medium that contains all of the data and software required to enable function as a directory server. Server 120 has connection to a data repository containing the directory contact records for all of the individuals covered by that server. A business associate may call into center 103 and request a conference with specifically identified individuals that may be listed in a directory server like server 120. In such an embodiment SW 116 running on server 110 may aggregate the contact information and, in some cases presence information from a directory server, based on a list that identifies each potential invitee by name and perhaps title. Directory server 120 may be a public directory or a private directory without departing from the spirit and scope of the present invention.

In one use case, a host may provide a points system that enables conference participants to earn points for every conference that they join including those they request. The points may later be redeemed for discounts on goods and services offered by that provider or by other participating providers. Enterprises may use the system as a type of outbound contact service that gathers many individuals to a conference where a product description, and use features are described.

During the conference a link, telephone transfer, telephone number, or other contact information might direct individual participants to a transaction process to complete orders for products or services demonstrated in the conferences. Points may be automatically calculated based on interactions and purchases. A single agent may be enabled to handle many transactions during the conference and new transactions may result in new and loyal repeat customers. In one embodiment a universal contact service (not illustrated) may be used to monitor and capture conference session data and to store and organize all of the contacts gained through the conference invitation process.

Figure 2:
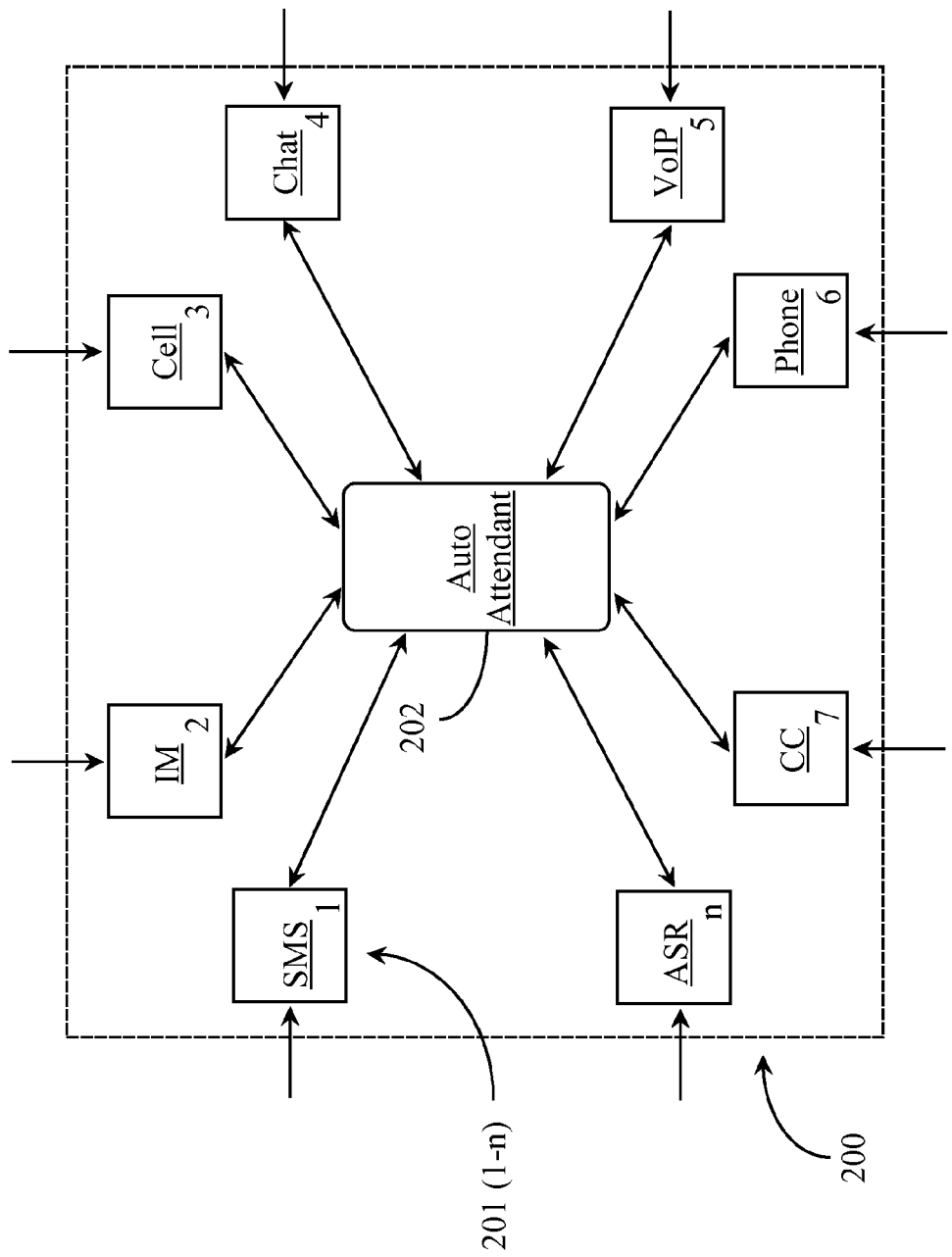
FIG. 2 is a block diagram depicting a multichannel conference bridge hosted by server 112 of FIG. 1.

FIG. 2 is a block diagram depicting a multichannel conference bridge 200 hosted by server 112 of FIG. 1. Conference bridge 200 may be a physical bridge such as a printed circuit board for connecting callers or a software application that represents multiple different channels and media types including telephone, voice over Internet, video, and text-based channels, or a combination. In this example, conference bridge 200 includes an auto attendant 202 representing a conference attendant that receives authentication information from conference joiners and connects them to the conference once authenticated. Auto attendant 202 may include voice and text recognition capabilities and logic for maintaining channel number and connection states for all of the channels occupied with participants. Some media channels may be created over shared bandwidth while other media channels may be dedicated channels without departing from the spirit and scope of the present invention.

In this logical representation, bridge 200 includes media channels 201 (1-n). Media channels 201 (1-n) include a short message service (SMS) channel 201 (1), an instant message (IM) channel 201 (2), a cell channel (cellular telephone) 201 (3), a Web chat channel 201 (4), a video over Internet protocol (VoIP) channel (201 (5), a phone channel (PSTN), a call center (CC) agent channel, which might be any media channel available, and an automated speech recognition (ASR) channel 201 (n). There may be many more channels of each type represented than are depicted in this example. A mix of channels that utilize shared bandwidth and dedicated channels might be provided for one multi-channel conference bridge.

Utilizing a multichannel platform in a predictive scenario such as outbound invitation enables likely more likelihood of acceptance of an invitation and connection, especially considering presence data relative to invitees. For example, presence data may in some cases be media specific where a potential invitee is available via Skype but not available using a telephone. By providing a seamless multichannel experience, users who are available at specific times over specific media channels may more readily accept an invitation when presented in the right media format. In one embodiment, invitees may list or have listed on their behalf two or more preferred channels and best times of availability for those channels. In this case, the outbound server may generate and send an invitation for the most preferred channel that indicates availability of the invitee for the time of the conference. Such intelligence may further increase the likelihood of acceptance of the invitation and eventually a successful induction of the user into the conference.

Figure 3:
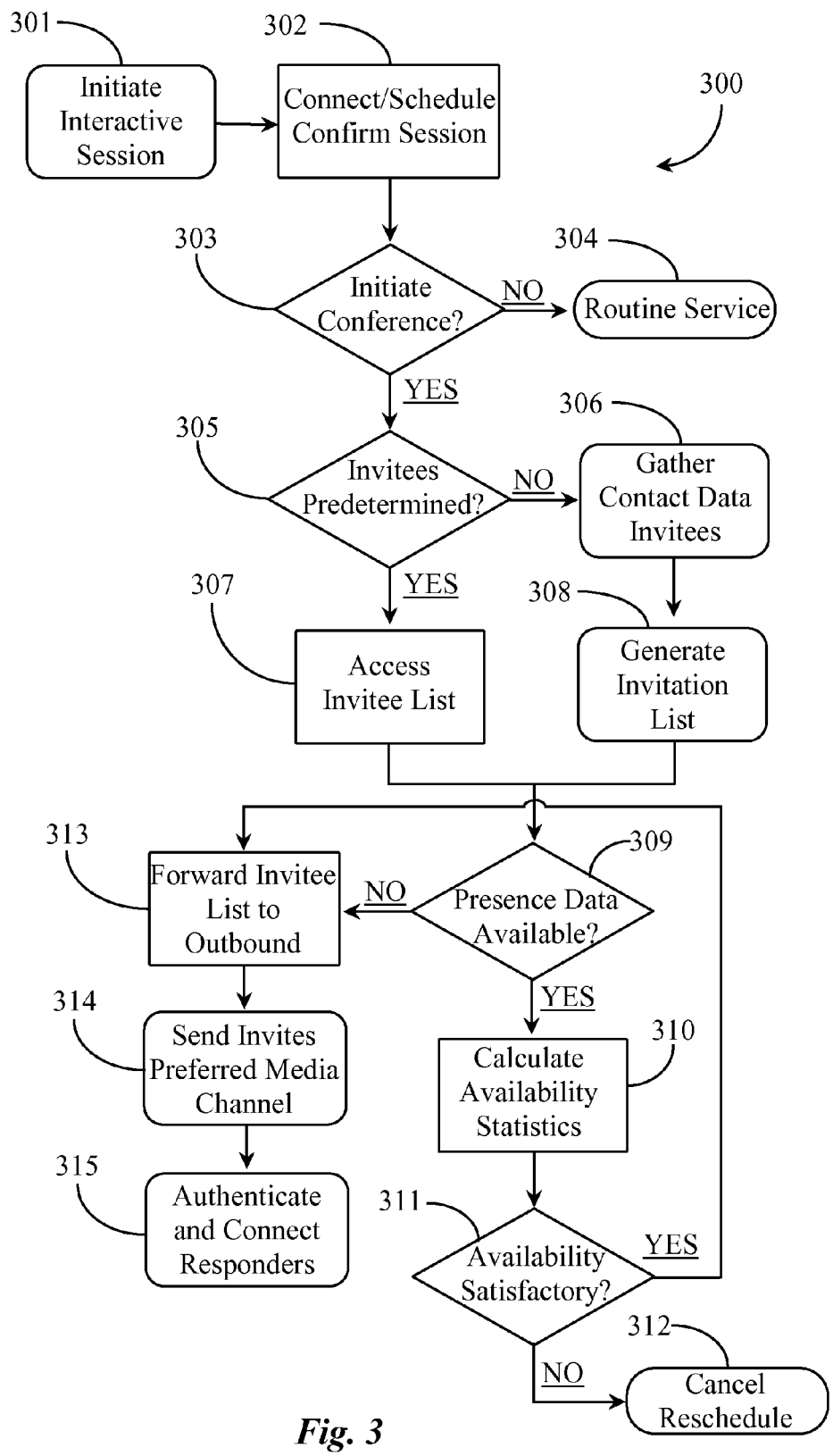
FIG. 3 is a process flow chart depicting steps for initiating a conference and inviting other users to join the conference.

FIG. 3 is a process flowchart 300 illustrating steps for initiating a conference and inviting other users to join the conference in an embodiment of the present invention. In step 301, a customer of a host enterprise may initiate an interactive session with the enterprise. The session may be a telephone call intercepted by IVR. The session might also be an interactive Web chat or a VoIP call. The interaction request is connected or scheduled and confirmed at step 302 as an active or scheduled session. The customer may be interacting with an automated system like an IVR or the customer may be connected to a live agent when the conference request is granted.

At step 303, the customer determines whether or not to initiate a conference. At step 303, if the customer declines to initiate a conference, the process resolves to step 304 where the customer is diverted to routine service. The option for initiating a conference may be an automated option presented through an auto attendant like an IVR unit. The option may also be verbalized to a customer by a live agent by telephone or indicated as a menu option in a Chat interface. There are many alternative configurations possible depending in part on the media of the interaction. If the customer determines to initiate a conference at step 303, the system receiving confirmation of the response, command, or selection, determines if potential invitees are predetermined and already known to the system.

If there are no predetermined invitees known to the system at step 305, the system resolves to step 306, and gathers invitee and associated contact data required to form an invitation list. The consumer may provide, for example, a list of names and the system may look up the contact data for those provided names. In one embodiment current presence data for the invitees is also gathered and considered. In one embodiment, where no invitees are predetermined, the system might suggest a number of contacts from a representative peer group having attributes in common with the customer initiating the conference. An example might be a service where a customer initiates a conference to bring one or several other customers that have already purchased and tested the product or service that might be subject of the interactive session of step 302. In this way the customer may get feedback from peers who use the products or services and may be better informed to make a purchasing decision based on the feedback.

In a case where no invitees were predetermined at step 305 and the information was subsequently gathered at step 306, the system generates at least one invitation list at step 308 to use for generating and sending invitations to conference. An invitation list may originally include all of the contacts and their preferred media types for communication. The list may later by further divided for the purpose of sending invitations over each media channel covered in the list. This, of course, assumes that the invite will be sent over the same media channel that has the best chance of being utilized by the invitee (considering preference and availability factors) should the invitee accept the invitation.

If the system determines at step 305 that the customer has predetermined invitees for the requested conference, the system may access one or more invitee lists at step 307. A predetermined list of contacts that are potential invitees may include individuals from one or more of the typical contact lists the customer may have stored on the connecting communication appliance. The type of list might vary according to the appliance. For example, a customer interacting by telephone may upload a speed dial list, a telephone contact list, an SMS contact list or the like if the telephone has data forwarding capabilities. Otherwise, the customer may grant access to another communications appliance that has the appropriate list(s) for upload to the system. In one embodiment, one or more predetermined contact lists may already be stored on behalf of the customer in a data repository accessible to the invitation software. The customer may also upload the contact information manually.

At step 309, the system may determine if presence data is available for any or all of the contacts on the generated invitation list. If current or at least relevant presence data is available for each contact in step 309, the system may calculate the availability statistics for the whole list of contacts at step 310. Such a process may run according to existing constraints and limits that may be applied by the service provider for governing or optimizing the process of invitation and subsequent acceptance and induction of each contact into the conference. It is important to note herein that current presence information may be utilized for optimizing invitation acceptance ratio statistics for conferences that are immediately initiated and activated impromptu. Presence data may also be projected or predicted for each contact dependant in part on schedules of those contacts and dependant in part on the type of media channel that is most available to a contact at a given time. Therefore, SW 116 of FIG. 1 may calculate future availability statistics for those contacts invited to a conference that was initiated, but that is scheduled in the future.

If it is determined at step 309 that there is no presence information available for the potential invitees, then the invitation list or lists may be immediately forwarded to the invitation apparatus, which might be an outbound contact server. In this case, the outbound server with the aid of SW 116 sends the invitations to the potential invitees over the preferred or "best" media channel determined to get the highest ratio of response for each contact. It is noted herein that in FIG. 1, SW 116 executes from a non-transitory medium associated with the processor of the outbound server. In this case, steps 309 and beyond are performed on the outbound server. However, SW 116 may be distributed to two or more processor-based machines indicating that steps 314 and 315 may be the only steps performed by the outbound server node. Moreover, other servers may be adapted by software to perform the function of invitation of potential invitees to conference. For example, if multiple different channels are used to deliver invitations, then servers dedicated to communication over specific channels might be used to send invitations generated for those channels.

In the case of no presence information at step 309, the outbound server may send invitations using the contact information provided for each contact. If a potential invitee has more than one listed channel for communication, and the channels are supported by the conference system, the SW may determine which of those channels to use for sending an invitation. In one embodiment, invitations may be sent over one, a subset or all of the channels listed for a potential invitee. If a potential invitee accepts an invitation associated with a specific channel like IM, for example, the potential invitee may still have the option to connect to the conference using a different channel supported by the conference bridge. At step 315, the conference system automated attendant listens for potential join requests arriving from the pool of accepting invitees and authenticates them if required and connects them to the active conference.

If it is determined at step 309 that presence information is available for the potential invitees on the invitation list or lists, the SW may calculate, at step 310, the availability statistics for all of the contacts that include the presence data. In this step, the system may determine a percentage ratio of potential invitees whose presence data shows a higher likelihood of receiving and responding to the invitation over those potential invitees whose presence data indicates less of a probability that they will accept the invitation. For example, of 20 potential invitees for an immediate conference, 14 may have current presence data set to available, while 6 may have presence data indicating that they are not available. The system may then determine at step 311 if the availability statistics calculated in step 310 are satisfactory, according to rules and constraints, for sending out the invitations to a conference having a stated start time and end time.

If the availability statistics are not satisfactory according to the rules and constraints governing presence-based invitation, the system may cancel or request that a conference be scheduled instead of immediately activated, or rescheduled at step 312 if the expected presence of the potential invitees shows that the preponderance will not be available at a scheduled time for a conference. However, if at step 311, the availability statistics are satisfactory according to the rules and constraints in place, the process may resolve to step 313 where the invitation process is initiated, in this case, at the outbound invitation server.

It is noted herein that it is possible to have a potential invitation list that reports current and expected presence data for some of the individuals listed but not for all of the individuals listed as potential conference invitees. The system may then calculate the statistics for the invitees showing presence data and assign a constant value to the invitees that do not have any presence information reported. The capability of predicting response rate by analyzing media channel dependant or overall presence data, both current state and predicted states, may lead to more efficient utilization of invitation and conference resources. As time progresses, invitees who are repeatedly asked to join in a conference may have longer term presence pattern analysis data associated with their media channels and normal schedules aiding further optimization of overall participation ratios in conference.

It is noted herein that preference data about potential invitees is not required in order to practice the present invention. However, where campaigns include many customers requesting conferences and where many invitees are targeted for each conference, considering current and projected or predicted presence states for invitees may help to optimize connect ratios, thereby mitigating costs of contact and connection, making the process more cost effective overall compared to standard outbound contact campaigns that rely on pools of available agents to be available at the time of connection. Other factors besides presence data may also be considered when generating invitation lists, such as invitee demographics, history of purchases, browsing history, search history, monetary status, stated personal likes and dislikes, past ad interaction history, and the like. Some of this information may be publicly gathered or it might be provided with the contact information if it has already been aggregated.

Figure 4:
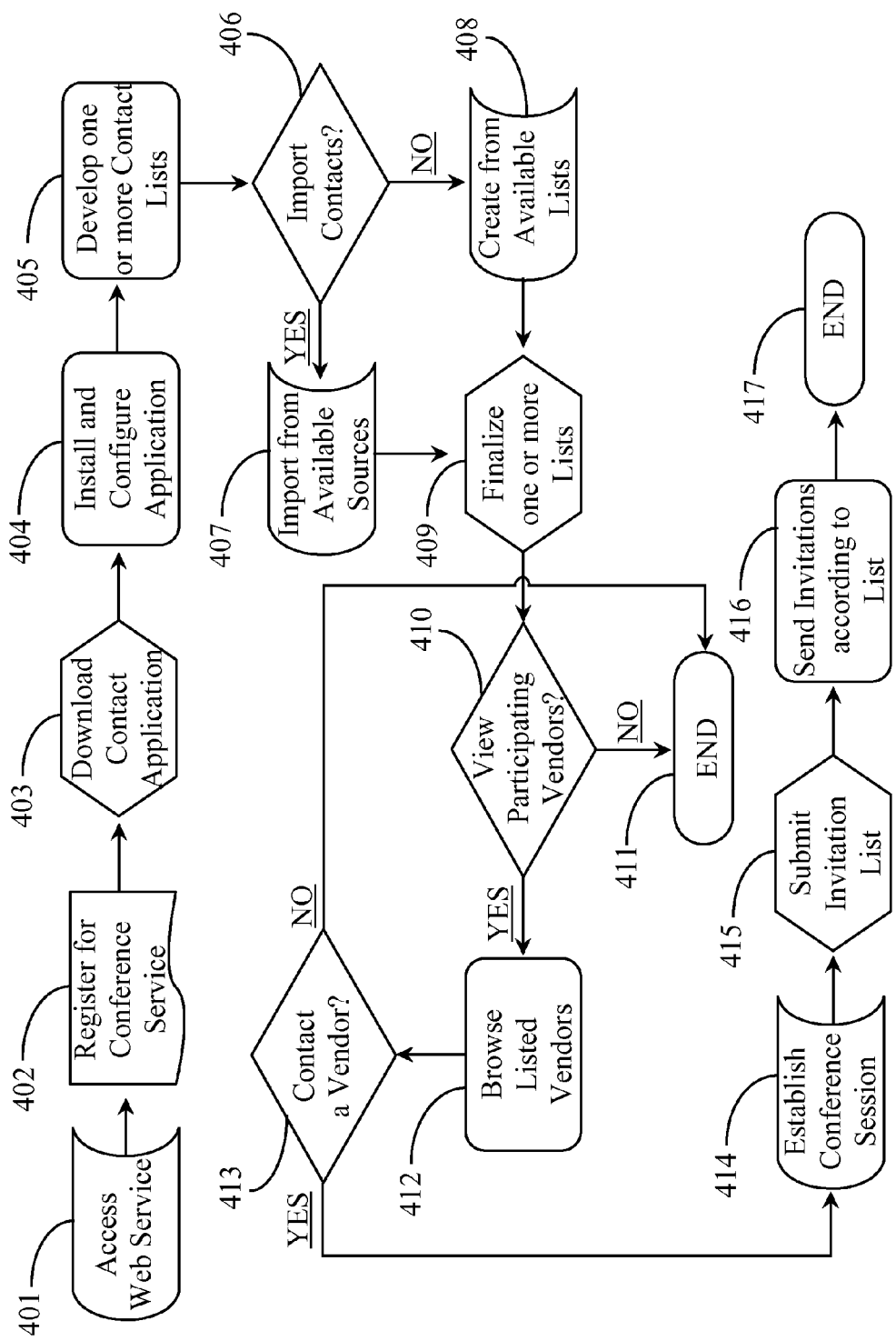
FIG. 4 is a process flow chart depicting steps for registering for a conferencing service and establishing a conference using that service.

FIG. 4 is a process flowchart depicting steps for registering for a conferencing service and establishing a conference using that service. In one embodiment of the present invention, users might pre-register for customer-centric conferencing services offered by a provider of such services through a Website interface provided for registration purposes. At step 401, a user may access a Web registration service offered by a providing entity. At step 402, the user may register for conferencing services by filling out one or more electronic forms or text fields provided during the registration process.

At step 403, the user may download a client application analogous to applications 118 and 119 of FIG. 1. It should be noted herein that a client application is not necessarily required in order to practice the present invention, but may provide additional functions and capabilities over those available to a user without such an application. At step 404, the application may be installed and configured for use during customer interaction with the provider or any participating vendor or business. The user may be prompted to create one or more preferred contact lists at step 405. During this process, the user may import contacts at step 406 from any list the user has control over including email contact lists, friends lists on social interaction sites, Web chat contacts, or other compiled contact lists. In this embodiment, the user may have complete control over the mix and match of contacts included on any list created.

If the user decides not to import contacts from other applications at step 406, then the process may skip to step 408 and the user may create a list from available lists on hand, adding and or deleting contacts manually. At step 409, the user may finalize one or more contact lists that represent pre-determined potential conference invitees. In one embodiment, there may be different lists created for different situations, such as a list for conferences involving technical service for computer products and a different list for conferences involving the potential purchase of computer-related products. In this scenario, the user may know which groups of potential invitees may be more responsive and beneficial to the user's goals during conferencing.

If the user decides to import contacts at step 406, the user may automatically import any contact information from locally available or network-accessible sources controlled by the user. The process resolves to step 409 where the user may finalize one or more lists. The finalized lists may include potential invitees having two or more contact media channels and current and or expected presence data associated with them generally or by media channel. The user may freely consider other factors when creating a list of pre-determined invitees including technical savvy, education, monetary status, likes, dislikes, political leanings, etc. Such considerations might be relative to the types of conferences that the provider makes available. For example, if the provider is a political entity or campaign and the conferences are about lobbying leaders about a specific political issue, political leaning may be a large factor in creating a list of potential invitees to a politically motivated conference. In other words the selection of potential invitees for any formalized and pre-determined contact list may depend in part on the nature of the conference that those invitees will be expected to join.

After the user has created one or more lists containing pre-determined conference invitees, the system may allow the user to view any participating entities such as vendors at step 410. This step may occur if multiple participating vendors offer customer-centric conferencing provided by a third-party (service provider). For example, customer-centric conferencing to present transaction opportunities in retail fashion, for example could include a number of competing vendors and the user may contact any one of those vendors to initiate a conference inclusive of the invitees on the customer-created list. In one embodiment, step 410 may occur before a final invitee list is finalized. The reason for this might be that different vendor conference opportunities may suggest a different mix of potential invitees if, for example, common attributes of the potential invitees are considered when forming lists.

It is noted herein that a user may simply create a stock list of potential invitees consisting of all of the contacts known to the user, for example, wherein the service finalizes invitation lists for specific conferences based on analysis of information known about the potential invitees. In this way much pruning of final lists falls on the shoulder of the service provider as opposed to the client. The service provider may have superior bandwidth and processing power to tailor final lists to products and services offered through customer-centric group conferences.

If the user decides at step 410 not to review participating vendors, then the process for setting up the service at the user's end may end for that user in step 411. If the user determines to view participating vendors at step 410, then the user may freely browse the product and service pages of those vendors at step 412. This step assumes of course that the service is for competing vendors that offer customer-centric conferencing options via the third-party provider (call center) to include potential additional customers through the customer-centric group conferencing model. The vendor pages may include ads for products and services, product and service description pages, and contact information for the user to contact the call center and initiate a customer-centric conference.

At step 413, the user (pre-registered and setup for conferencing with the aid of the client application) may be prompted to contact a vendor to initiate a customer-centric conference session. If the user determines not to contact a vendor at that time, the process may end for that user back at step 411. However, if the user determines to contact a participating vendor at step 413, then the process moves to step 414 where the user contacts the vendor (call center) and establishes a conference session. The user may contact the vendor but decline to establish a customer-centric conference, however, at first contact or during interaction, the option may be provided to the customer.

This process assumes that the customer intends to establish a customer-centric conference session if the vendor is contacted at step 414. In this step, the conference is granted and the user may receive confirmation of the conference and the start date and time of the conference if it is scheduled out from the date and time of contact. At step 415, the customer may submit to the service one or more invitation lists for processing. At step 416, the system generates and sends the invitations according to list parameters and any rules or constraints in effect. The process then ends at step 417 with the invitations sent to all of the potential invitees on the finalized list.

In one aspect of the process the customer might generate and send invitations to potential conference participants using the downloaded client application without departing from the spirit and scope of the present invention. This option might be utilized for smaller conferences expecting perhaps 10 or fewer invitees to accept invitations and join the conference. The outbound service may require a minimum number of invitations to generate and send on behalf of the customer for all conferences or for conferences about certain products, services or other subject matters. It is noted herein that the process is not limited to vendors competing for new business. Other entities such as professional organizations, political organizations, non-profits, and others who are not selling products or services might use the system of the invention to aid their goals in building followers, attracting new members, garnering political support from a community, and so on. There are myriad possibilities.

Figure 5:
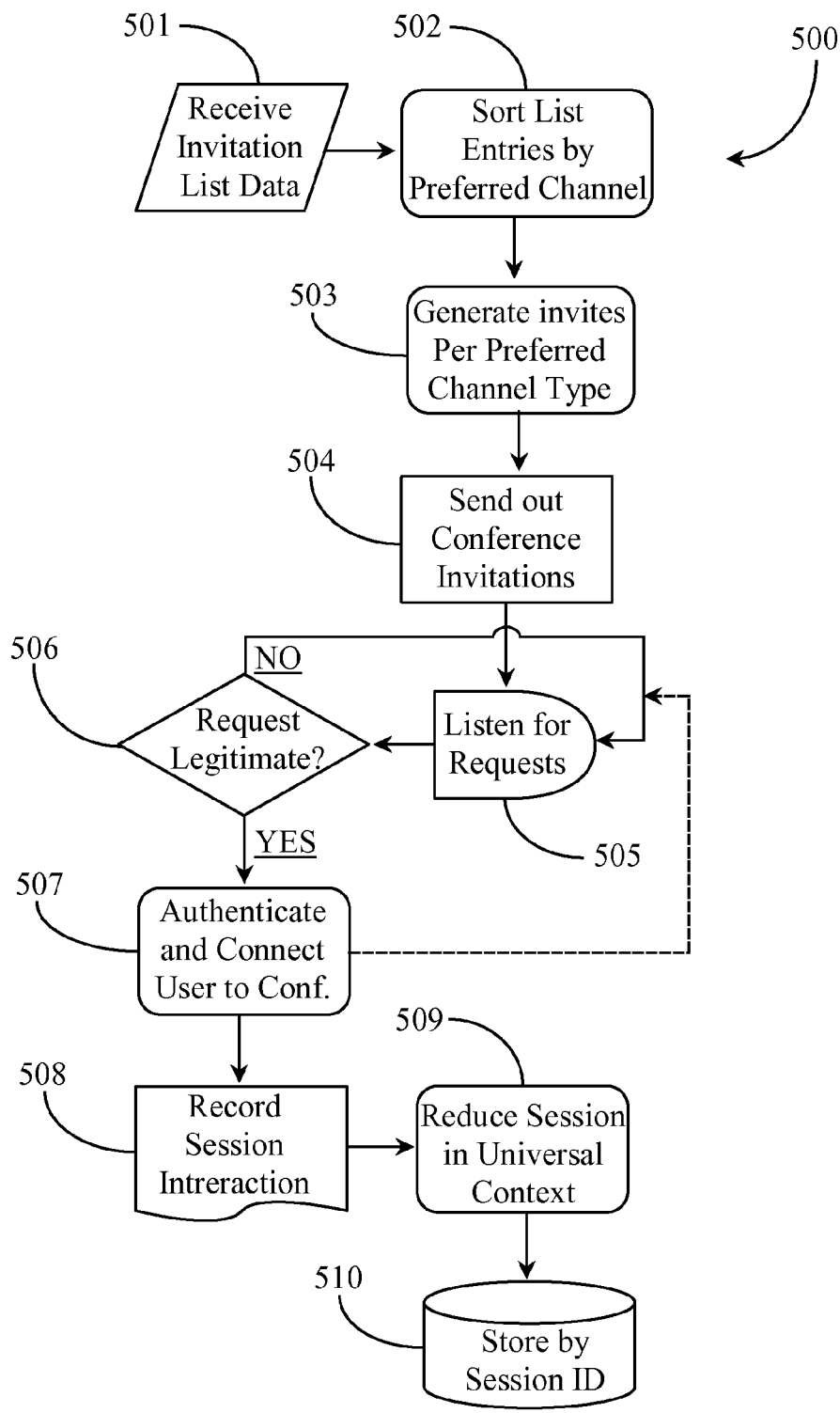
FIG. 5 is a process flow chart depicting steps for processing received invitation data to generate and send invitations to potential conference invitees.

FIG. 5 is a process flowchart 500 depicting steps for processing received invitation data to generate and send invitations to potential conference invitees. Process 500 assumes that a customer has contacted a vendor or other provider and has initiated and received confirmation of a pending customer-centric conference. At step 501, the outbound invitation system (SW 116, FIG. 1) may receive pre-determined invitation list data from the customer or from a local repository at the service side of the connection. At step 502, the system may presort potential invitees on a list or lists by preferred or optimum media channel if not already sorted. In this step, there might be media channels that potential invitees are currently available on making them optimum channels for sending out an invitation. If all of the contact data for the potential invitees is a same media channel like telephone, for example, step 502 and subsequent step 503 are not required.

At step 503 the system generates invitations per preferred or optimum media channel type (assuming multiple separate media channels). At step 504, the conference invitations are sent out. Some invitations may be called out by telephone, some may be posted to personal profile pages such as a Facebook wall, and others may be sent out by electronic message. In one embodiment, if there is more than one contact data set for a potential invitee, more than one invitation to the conference may be sent, such as one invitation per different channel. In another embodiment, a priority scheme may be observed for potential invitees having more than one channel indication. In this case the system may try the highest priority channel and wait a reasonable amount of time to determine if the invitation was accepted or not. If no confirmation of acceptance is received, then the system may follow up by a second attempt using the next highest priority channel indicated and so on. The outbound invitation system may monitor the acceptance or non-acceptance state of an invitation through reporting by the system that receives the acceptance confirmation from the invitee. If the outbound system incorporates all of the communications channel facilities, then it may simply detect when invitations are accepted.

At step 504, the outbound system sends out the invitations to the invitees on the list. At step 505, the conference system listens for requests from invitees who have accepted invitations from the outbound invitation service. Requests may come in for many different running conference sessions taking place in the conference system. For each request, the conference system determines at step 506, if the request is a legitimate request meaning, that the request is legitimate for an invitee who was invited to join a specific running conference instance. If at step 506, the system determines that it is not a legitimate request for a running conference instance, the process loops back to step 505. In one embodiment, there may be a limited time window once a conference has started where invitees may join. After the time has expired, the conference might be closed to additional users trying to connect.

If the conference system determines at step 506 that the request is a legitimate request for a running conference instance, the conference system authenticates and connects the user into the conference at step 507. The user is typically connected over the same media channel used to attempt to join the conference. Therefore, if a user calls in using a telephone, the user may remain on the telephone to join the conference. In some cases, an invitee may attempt to join the conference using a media channel that is different from the channel used to invite the user, which may be the channel where the system expected the user to be most available. In this case the user may simply provide the session ID or personal identification number sent in the invitation to join the conference using the present media channel. The process loops back to step 505 from step 507 (broken line) for every invitee attempting to join a running conference until all of the invitees who have accepted invitations have joined, or until a certain time period within which users may join the conference expires during the session.

At step 508 in one embodiment the system records all of the conference interaction data. This may include recording video, sound, graphics like whiteboard interactions, and text. Optionally, at step 509, the recorded media may be reduced to a universal text context for storage in a data repository accessible to the application. The universal data is stored by session identification (ID) or other identifiers for later retrieval and review at step 510. The video, sound, and additional graphics may also be retained in their media forms for later review. Conference data in the archives may be searched and cross-referenced to product and service information. New participants may be permanently stored as new customers of the participating vendor and their contact data saved for future campaigns.

As time progresses, additional information about conference participants may be retained by the system during subsequent contact between the vendor and the new customers and that information may then be considered when creating new invitee lists for new conferences. For example, invitees that were inducted into customer-centric conferencing through different customers may find themselves invited to a same conference initiated by a customer that did not previously know the contacts. In this scenario, the service provider may select these invitees to add to a customer invitation list or to create a "system" invitation list from customer contact records based on common targeted attributes resulting from the type of conference requested by the new customer. A case in point might be a customer that wants to initiate a conference to get feedback on a product or service offered, but has no suggestion of available contacts that have experience with the offered product or service. In this case the system may create the contact list from any records from previous conferences to which it has access. These users may readily participate in light of incentives or points they may earn through their acceptance of invitations and subsequent participation in such conferences.

In another embodiment of the invention conference amendment and alteration may be made as a result of circumstances or events that occur during a conference. For example, it may become apparent to one or more participants that there are one or more additional persons who should be joined to the conference. Functionality in such an embodiment is provided to discover contact information for any person so identified and authorized by the participants, and for inviting that person or persons to join the conference.

In another aspect, a subset of participants in a conference may gravitate toward certain subject matter, and another subset toward another subject matter, in which case functionality is provided to split the conference into separate sessions, one session for each such subset. Further still functionality is provided in some embodiments to enhance media mix, and/or to split or merge conferences based on media being used. In specific embodiments control and configuration as described above may be accessed and used by the contact center agent or agents involved in the conference.

It will be apparent to one with skill in the art that the system of the invention may be utilized in different scenarios such as in a technical support scenario or an announcement scenario where information may be of interest to a broader audience. The system may be incorporated in a friend scenario where the initial customer might have friends join because that may ask better questions. Still other scenarios may include the customer as part of a group and the invitees are other members of the group. A provider may offer discounts if a minimum number of invitees join a conference on behalf of the customer. In one case, the system may schedule a conference out to a later date and time if the availability (presence information) of the invitees suggests that the session should be scheduled later rather than at the time of the request. The system may also be used in a scenario where customers may conference with members of their own community whom have had the same issues the customer is having in the past or have profiles matching to some extent with the requesting customer. There are many possibilities.

It will further be apparent to the skilled person that the customer-centric conferencing system of the invention may be provided using some or all of the mentioned features and components without departing from the spirit and scope of the invention. It will also be apparent to the skilled person that the embodiments described above are specific examples of a single broader invention that may have greater scope than any of the singular descriptions taught. There may be many alterations made in the descriptions without departing from the spirit and scope of the present invention.

What is claimed is:

1. A communication system comprising:
    a processor; and
    a memory, wherein the memory stores instructions that, when executed by the processor, cause the processor to:
        establish a communication session between an initiator and an agent of an enterprise hosting the communication system;
        receive a command to set up a conference;
        identify a list of potential conference participants other than the initiator and the agent;
        determine presence information of each of the potential conference participants in the list;
        send an invitation to the conference to a first one of the potential conference participants whose presence information is positive;
        refrain from sending the invitation to a second one of the potential conference participants whose presence information is negative; and
        transmit a command to connect the first one of the potential conference participants to the conference in response to the first one of the potential conference participants accepting the invitation.

2. The communication system of claim 1, wherein the command is provided by the initiator during the communication session in response to interacting with an interactive voice response server, wherein the interactive voice response server is configured provide a query to the initiator, wherein in response to the query, the interactive voice response server receives indication of intent of the initiator to set up the conference.

3. The communication system of claim 1, wherein the instructions further cause the processor to:
    receive an invitation list with the list of potential conference participants from a computerized device accessible to the initiator.

4. The communication system of claim 1, wherein the instructions further cause the processor to:
    generate an invitation list with the list of potential conference participants.

5. The communication system of claim 1 wherein the instructions further cause the processor to gather information of the potential conference participants from at least one of a contact list of friends, a public contact directory, or a customer contact list, for generating the list.

6. The communication system of claim 1, wherein the first one of the potential conference participants participates in the conference via at least one of a telephone, videophone, voice over Internet protocol (VoIP), video over Internet protocol, short message services (SMS), multimedia message services (MMS), chat, or instant message (IM).

7. The communication system of claim 1, wherein the enterprise hosting the communication system is a sales enterprise, and wherein the instructions further cause the processor to offer rewards to the initiator for providing the information about at least one of the potential conference participants.

8. The communication system of claim 1, wherein the instructions further cause the processor to access a pre-stored profile associated with the initiator, wherein the pre-stored profile contains information about at least one potential conference participant.

9. The system of claim 1, wherein the presence information is indicative as to availability of the potential conference participant.

10. The system of claim 9, wherein the presence information is specific to a particular media channel, wherein the instructions cause the processor to send the invitation for the first one of the potential conference participants, via the particular media channel.

11. The system of claim 10, wherein the instructions further cause the processor to:
receive a request to join the conference from the first one of the potential conference participants using a second media channel different from the particular media channel, wherein the instructions that cause the processor to transmit the command include instructions that cause the processor to transmit the command to connect to the second media channel.

12. A method for establishing a conference, the method comprising:
establishing, by a processor, a communication session between an initiator and an agent of an enterprise hosting a communication system;
receiving, by the processor, a command to set up a conference;
identifying, by the processor, a list of potential conference participants other than the initiator and the agent;
determining presence information of each of the potential conference participants in the list;
sending, by the processor, an invitation to the conference to a first one of the potential conference participants whose presence information is positive;
refraining from sending the invitation to a second one of the potential conference participants whose presence information is negative; and
transmitting, by the processor, a command to connect the potential conference participants to the conference in response to the first one of the potential conference participants accepting the invitation.

13. The method of claim 12, wherein the command is provided by the initiator during the communication session in response to interacting with an interactive voice response server, wherein the interactive voice response server is configured provide a query to the initiator, wherein in response to the query, the interactive voice response server receives indication of intent of the initiator to set up the conference.

14. The method of claim 12, further comprising receiving, by the processor, an invitation list with the list of potential conference participants from a computerized device accessible to the initiator.

15. The method of claim 12, further comprising generating, by the processor, an invitation list with the list of potential conference participants.

16. The method of claim 12 further comprising, gathering, by the processor, information of the potential conference participants from at least one of a contact list of friends, a public contact directory, or a customer contact list, for generating the list.

17. The method of claim 12, wherein the first one of the potential conference participants participates in the conference via at least one of a telephone, videophone, voice over Internet protocol (VoIP), video over Internet protocol, short message services (SMS), multimedia message services (MMS), chat, or instant message (IM).

18. The method of claim 12, further comprising offering, by the processor, rewards to the initiator for providing the information about at least one of the potential conference participants wherein the enterprise hosting the communication system is a sales enterprise.

19. The method of claim 12, further comprising accessing, by the processor, a pre-stored profile associated with the initiator wherein the pre-stored profile contains information about at least one potential conference participant.

* * * * *